United States Patent [19]

Carts, Jr. et al.

[11] Patent Number: 4,937,442
[45] Date of Patent: Jun. 26, 1990

[54] PROTECTIVE SHUTTER

[75] Inventors: Stanley L. Carts, Jr.; James R. Adamson, Jr., both of Alexandria; Elliott Lloyd, Lorton, all of Va.

[73] Assignee: The United States of America as represented by the Secretary of the Army, Washington, D.C.

[21] Appl. No.: 500,206

[22] Filed: May 27, 1983

[51] Int. Cl.$^5$ ............................................. H01J 31/50
[52] U.S. Cl. ............................. 250/213 VT; 250/229
[58] Field of Search ................. 250/214, 213, 214 R, 250/229, 231 P, 237 R, 227, 213 VT, 227; 350/266, 269, 270; 354/227.1, 230, 250

[56] References Cited

U.S. PATENT DOCUMENTS

| | | | |
|---|---|---|---|
| 2,917,795 | 12/1959 | Brown | 250/229 X |
| 3,121,798 | 2/1964 | Ploke | 250/229 |
| 3,628,024 | 12/1971 | Ciemochowski | 250/231 P X |
| 3,631,252 | 12/1971 | Gebel | 250/229 X |
| 3,779,544 | 12/1973 | Wasielewski et al. | 250/229 X |
| 3,792,916 | 2/1974 | Sarna | 350/290 |
| 4,257,017 | 3/1981 | Bradley et al. | 350/266 X |
| 4,415,231 | 11/1983 | Kaczensky et al. | 350/269 |

FOREIGN PATENT DOCUMENTS 1208213 10/1970 United Kingdom ................ 350/312

Primary Examiner—Brian S. Steinberger
Attorney, Agent, or Firm—Milton W. Lee; Max L. Harwell; Anthony T. Lane

[57] ABSTRACT

A fast acting electromagnetically operated shutter for protecting an imaging system from damaging light, such as intense laser light, comprised of a plurality of vane type shutters driven by magnetically moveable linear racks transferring linear to rotary motion to the midportion of each vane to aid in overcoming inertia. The linear racks are comprised of an upper rack at one end of the shutters and a lower rack at the opposite end of the shutters wherein both upper and lower racks simultaneously move reciprocally together. The racks have gear teeth thereon that are meshed with alternate vanes from first the upper and then the lower racks to transfer opposing directional rotation to adjacent vanes. An electronic shutter control means responds to input damaging light intensity signals impinging light detecting sensor means. The electronic means has the capacity to lock onto light pulsed threats, track the frequency of the threats, and control the shutter in such a manner as to neutralize the threat or alternately to close the shutter as long as a continuous wave light threat is present.

8 Claims, 8 Drawing Sheets

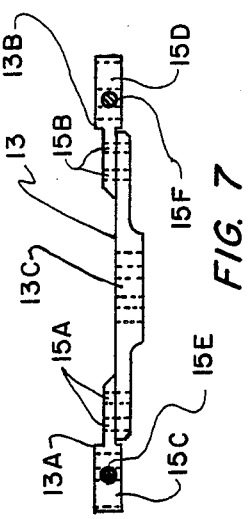
FIG. 4
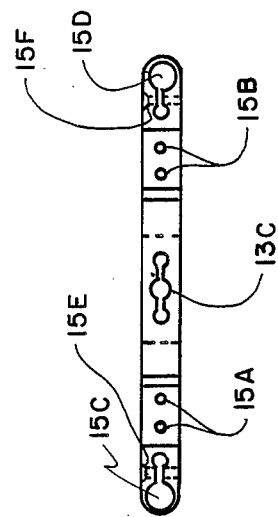
FIG. 7
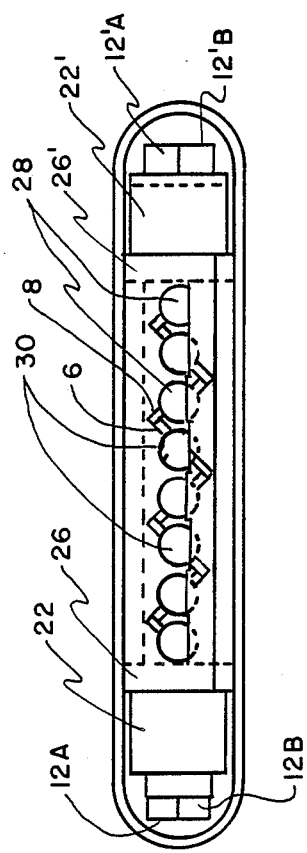
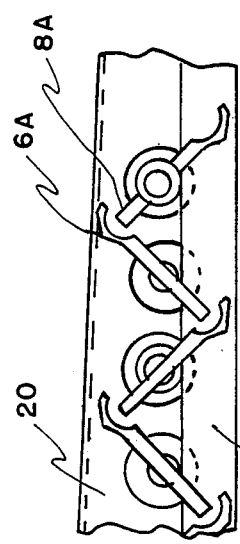
FIG. 6
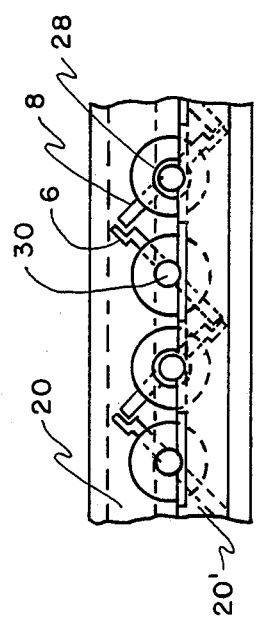
FIG. 5
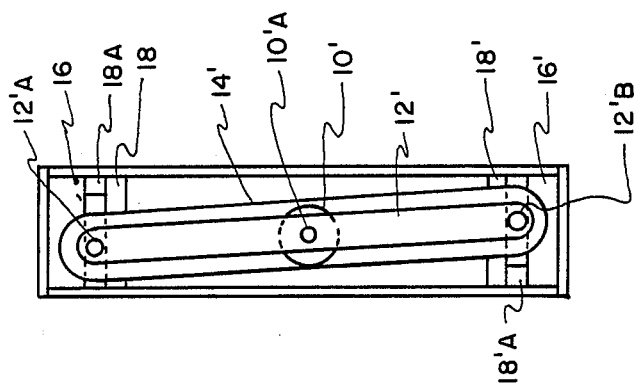
FIG. 3

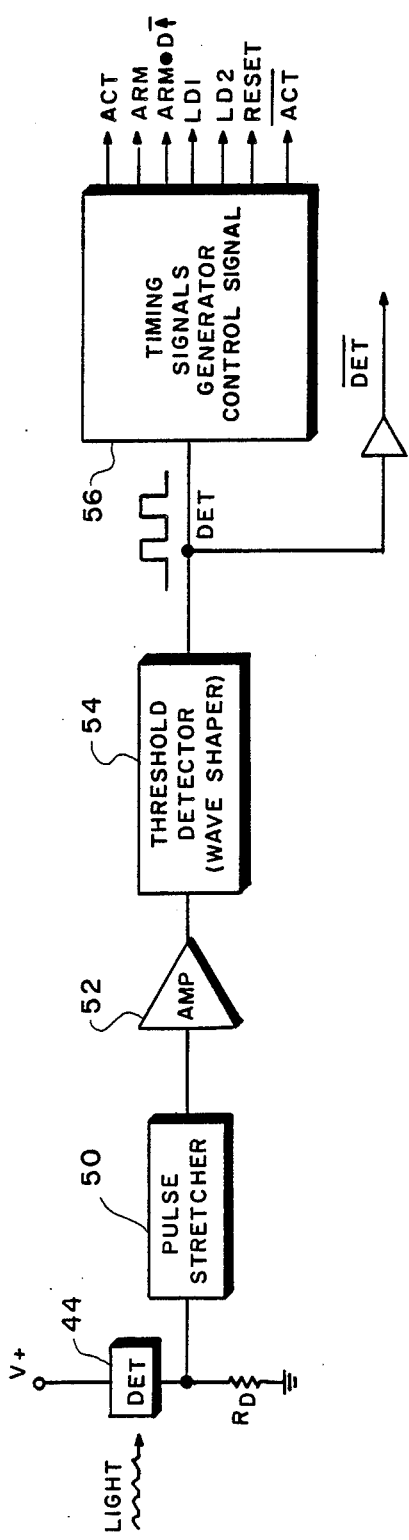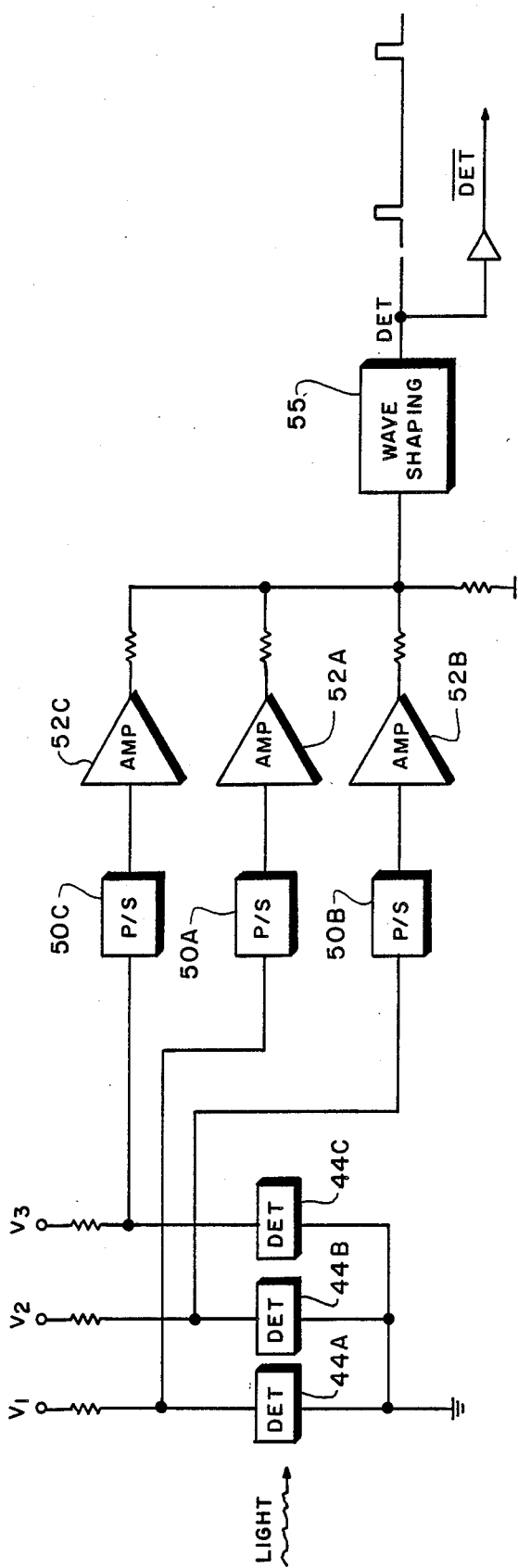
FIG. 9
FIG. 10

$t_s$ = RESPONSE TIME OF SHUTTER

PROTECTIVE SHUTTER

The invention described herein may be manufactured, used and licensed by the U.S. Government for governmental purposes without the payment of any royalties thereon.

BACKGROUND OF THE INVENTION

The present electromagnetic shutter mechanism includes an electronic closing means that predictably closes the shutters in a shutter mechanism in advance of an extremely intense light pulse threat to provide protection for optical imaging systems.

DESCRIPTION OF PRIOR ART

Electromagnetically operated shutter mechanisms are well known in the art. It is not known if any of these electromagnetically operated shutter mechanisms normally operate in the open mode and also have the ability to predict when a damaging intense light source may cause damaging light to pass through the open shutters and to activate the shutter mechanism to be closed by the time the damaging light arrives. Further, prior shutter mechanisms have been very slow speed for the extremely fast response time needed for protective closing, versus uses of shutters say for example in photographic cameras.

The use of protective shutters for protecting imaging systems has two important tasks, namely to remain open during as much of the normal operating time as possible yet to eliminate damaging light from an intense light source, whose specific purpose is to damage or destroy detectors in an imaging system, from entering the optical system during this desired non-operative or protective time.

The present invention provides both these desired features and other advantages as will be explained herein below.

SUMMARY OF THE INVENTION

The present invention provides a shutter closing means comprised of a fast acting shutter mechanism used with an imaging system or the like having a light sensor means on the image input side of the shutter mechanism which detects the presence of damaging intense light from a high energy light source, such as a high power laser, impinging thereon and provide an input signal to an electronic shutter control means to close the shutters of the shutter mechanism. The electronic means permits a mechanical shutter, with a slow response time as compared with the damaging light threat, to be used in providing protection for an imaging system. The electronic means is comprised of an advance operable shutter closing means which takes the frequency of the damaging intense light if the light is arriving in pulsed form and advances the operation of the shutters to a time prior to the arrival of subsequent intense light pulses, which is the measured response time of the closing of the shutters in the shutter mechanism. The electronic means further renews the timing of shutter closing in the advance operable shutter closing means on repeated cycles of arrivals of the damaging intense pulsed light. The electronic means is further comprised of a continuous shutter closing means that operates the shutter mechanism during the presence of continuous wave damaging intense light. This portion of the electronic means is preferably connected in parallel with the advance operable shutter closing means so that one may operate independent of the other according to the type light threat present at the input to the imaging system. The continuous shutter closing means closes the shutters after the continuous wave leading edge has impinged on the front of the imaging system and maintains the shutters closed during the remainder of the time that the continuous wave damaging intense light is present. The continuous shutter closing means operation does not affect the operation of the advance operable shutter closing means since it reacts more slowly.

The advance operable shutter closing means has the ability to lock onto a damaging pulsed light threat, to track its frequency of arrival at the input to the imaging system, and to advance the start of the closure of the mechanical shutters to neutralize the thread of damage to the detector array within the imaging system. It should be noted that for the advance operable shutter closing means to commence operation that of necessity the first two pulses must impinge on the imaging system to start the timing of the pulses. However, because of the short duration of the pulse and the fact that it can only be detected once the pulse has occurred, the only problem would be if there was a mission kill of the imaging system. It has been found that two high intensity light pulses, as from a high energy pulsing laser having pulses of very short duration, do not totally damage an imaging system but repeated high energy laser pulses would severely damage the system. Further, if the damaging light threat can be detected before it comes within the imaging system field-of-view, the present electronic means could prevent the imaging system from being damaged at all. The worse case would be if the first two light pulses occurred in the direct line of the field-of-view. However, the light sensor means is preferably comprised of a plurality of sensor detectors which are facing in different directions about the centerline of the imaging system and should start picking up the first two pulse counts in a fringe area of the field-of-view in which the pulse power level would be greatly reduced than that of a direct centerline hit of the damaging intense light.

The shutter mechanism is comprised of a plurality of parallel vane type shutters in which adjacent pairs of the vanes rotate in opposite directions about an axis generally in the center of each vane to minimize inertia of the shutter mass. The shutters are rotated by gear teeth on an upper linear rack gear meshed to teeth on one end of alternate shutters and gear teeth on a lower rack gear meshed to teeth at the other end of the other alternate shutters wherein said upper and lower racks are hard connected to solenoid controlled yokes at each end thereof. The upper and lower racks move in unison wherein their reciprocal movement translates rotational motion to alternate shutters in opposite directions causing opening of the shutters when the racks move in one direction and closing of the shutters when the racks move in the opposite direction.

A better understanding of the present electromagnetically controlled shutter mechanism will be had by the following detailed description with reference to the accompanying drawing.

BRIEF DESCRIPTION OF THE DRAWINGS

FIG. 3 is a sectional view 3—3 of FIG. 1 better illustrating the skewed end yokes that drive the upper and lower racks;

FIG. 4 is a sectional top view 4—4 of FIG. 1 showing the arrangement of the racks and shutters;

FIG. 5 illustrates an enlarged portion of FIG. 4 showing one type configured shutters;

FIG. 6 illustrates another configuration of the shutters;

FIGS. 7 and 8 illustrate a side and end view of another embodiment of the yokes than of that shown in FIGS. 1 and 3;

FIG. 9 is a schematic block diagram of the electronic means which selectively activates the solenoid driven shutter mechanism;

FIG. 10 illustrates a schematic of a multiple detector electronic means for operating the shutter mechanism;

DETAILED DESCRIPTION OF THE PREFERRED EMBODIMENT

Figure 2:
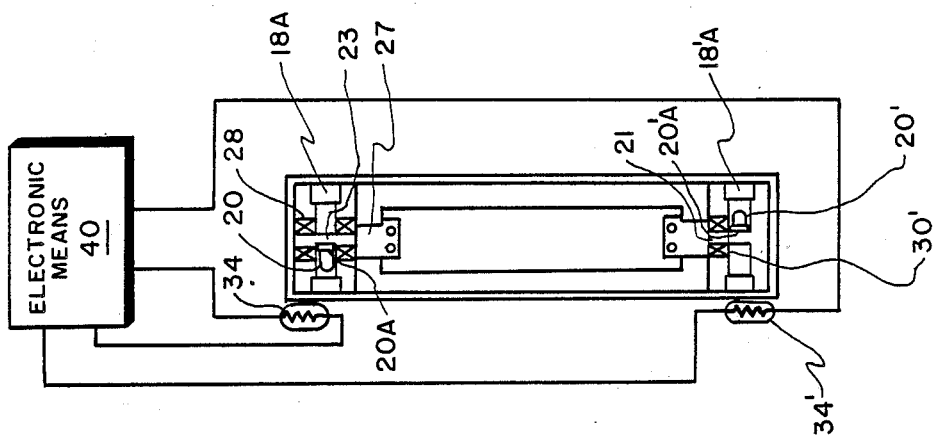
FIG. 2 is a sectional view 2—2 of FIG. 1 illustrating the placement between the racks and the shutters.
Figure 1:
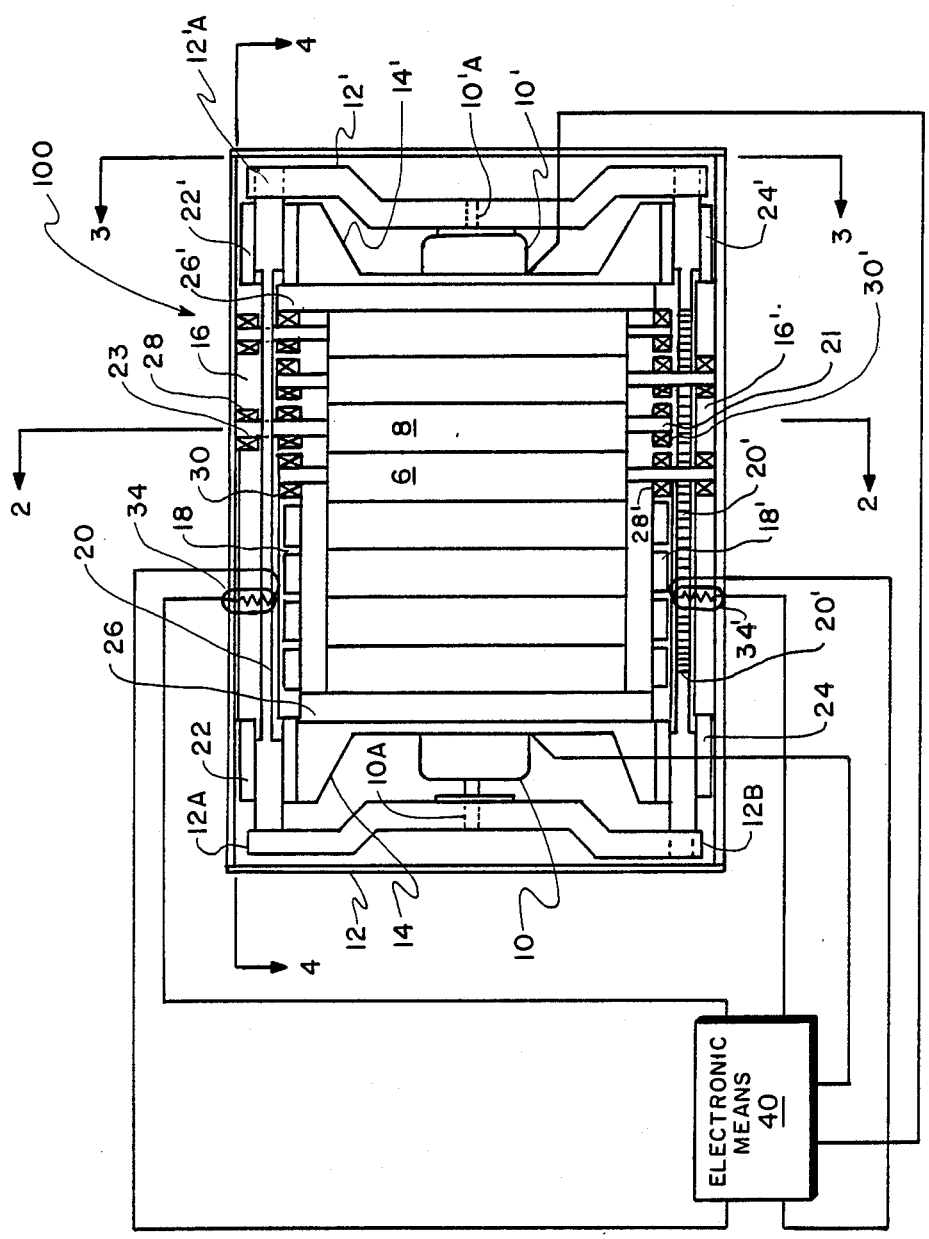
FIG. 1 is a schematic front view, with portions shown in section and in block diagram, of the present electromagnetically operated shutter mechanism with the double yoke connected racks moved to the extreme left side of the figure and the shutters closed.

Refer to FIGS. 1 through 8 for an explanation of the present shutter mechanism with some alternate embodiments of the shutters and the solenoid controlled dual yokes. It should be noted that with so many dual elements comprising the present shutter mechanism that many of the numbers are primed to more clearly indicate that the referenced elements do the same functions. FIGS. 2 through 4 also will occasionally need to be referred to in describing the same numbered elements of FIG. 1. FIG. 1 illustrates the electronic shutter control means 40 in block diagram form, but the electronic means portion of this application will be fully elaborated on herein below with specific references to FIGS. 9 through 16. The electronic means 40 is triggered by a light sensor means or detector, represented by sensors 34 and 34' and perhaps positioned to face toward the upper and lower fields-of-view but such is only representative since a larger number of sensors facing in other directions may be used to first start sensing damaging light at the outer extremities before the light becomes too damaging at the imager centerline. Outputs from the electronic means 40 control the action of solenoids 10 and 10' according to the input thereto from the light sensor means.

Solenoids 10 and 10', at opposite ends of shutter mechanism 100, are firmly attached to linear bearing mounts 14 and 14' which are attached to the shutter mechanism frame upright spreaders 26 and 26'. Inner and outer bearing block rack guides 18 and 16 respectively on one side and 18' and 16' on the other side of spreaders 26 and 26' also comprise a portion of the shutter mechanism frame. Inner bearing block rack guides 18 and 18' have a plurality of feet 18A and 18'A respectively that are embutted against the flat outer bearing block rack guides 16 and 16' to provide a linear open space for upper and lower linear racks 20 and 20' to readily move. Inner and outer rack guides 18 and 16 also have bearings therein through which the axis of the vane type shutters pass. The shutter axis are comprised of pinion wires 23 which are clamped into the vane holders 27 (See FIG. 2) which are firmly attached to alternate vanes 6 or 8. Vanes 6 and 8 are illustrated as one of the adjacent pairs of said plurality of shutters. The bearings in the racks 20 and 20' are alternately double bearings 28 and 28' and single bearings 30 and 30'. The double bearings 28 and 28' are used when either the upper or lower linear racks 20 or 20' alternately threadably mesh with the threaded pinion wire 23 axis of either of shutters 6 or 8 to impart translation motion of the racks to rotational motion of vanes 6 and 8 about axis 23. The single bearings 30 and 30' are used as an idler bearing on the opposite ends of shutters from the imparted rotational motion. The linear bearing mounts 14 and 14' have linear bearings through which the upper and lower racks move. These linear bearings are respectively 22 and 22' for the upper rack 20 and 24 and 24' for the lower rack 20'.

In operation of the shutter mechanism 100, the plurality of shutters are shown closed with racks 20 and 20' moved to the left side. The gear teeth 20'A on the lower rack 20' can easily be seen in FIG. 1, but gear teeth 20A of the upper rack 20 are not visible. However, refer to FIG. 2 for a better illustration of teeth 20A and 20'A relative to the pinion wire axes 23 and vane holders 27 and vane shaft 21 at the single bearing 30'.

FIG. 3 illustrates the view through section 3—3 of FIG. 1 and shows a side end view of the shutter mechanism 100. It can easily be seen how the yoke 12' and the linear bearing mount 14' are skewed so that the upper yoke end 12'A and lower yoke end 12'B are linearly aligned with the upper and lower racks respectively. On the left side of mechanism 100 are upper yoke ends 12A and lower yoke ends 12B aligned with 12'A and 12'B. Solenoid rods 10A and 10'A are clamped to yokes 12 and 12' respectively and are free to move through solenoids 10 and 10' by energization of the solenoids. Magnetic action of the solenoids 10 and 10' pull rods 10A and 10'A and thus the entire moving portions of the shutter mechanism 100, namely the yokes 12 and 12', the upper and lower linear racks 20 and 20' and the vane shutters 6 and 8.

Refer now to FIGS. 4 and 5 along with FIG. 1 and it can be seen that since the upper and lower racks are alternately threadably connected to the pinion wire 23 axes of adjacent shutters the adjacent pairs of shutters rotate in opposite directions. As an example, when the upper and lower racks return to the right side of FIGS. 1-3 lower linear rack 20' is threaded on the bottom side of pinion wire 23 at double bearing 28' to rotate shutter 6 counterclockwise and the upper linear rack 20 is threaded on the top side of pinion wire 23 at double bearing 28 to rotate shutter 8 clockwise. Obviously, when shutter 6 is rotated counterclockwise and shutter 8 is rotated clockwise along with all the other adjacent shutter pairs 6 and 8 then the shutters are open, thus allowing light transmission therethrough.

Two configurations for the vane type shutters which overlap at the joining ends are anticipated and are shown respectively in FIGS. 5 and 6. In FIG. 5, one end of each of the vanes has an offset thereon into which the square end of the adjacent vane fits when the shutter mechanism 100 is closed. In FIG. 6, one end of each of the vanes has a cupped out section on a side thereof into which the square end of the adjacent vane rotates when the shutter mechanism 100 is closed. These configurations block the light from passing through the shutter mechanisms. The vanes may be made of a light plastic or polyester sheets of material that are of flat black.

Another embodiment of the yokes is shown in FIGS. 7 and 8 which has a center portion 13 into which the solenoid rod is attached in the opening 13C. On each end of center portion 13 are end yoke mounts 13A and 13B into which upper and lower racks fit into openings 15C and 15D respectively. End yoke mounts 13A and 13B are attached to 13 by convenient connecting means through connecting holes 15A and 15B. Screw threadable means 15E and 15F may be used to secure the upper and lower racks in openings 15C and 15D respectively.

Figure 11:
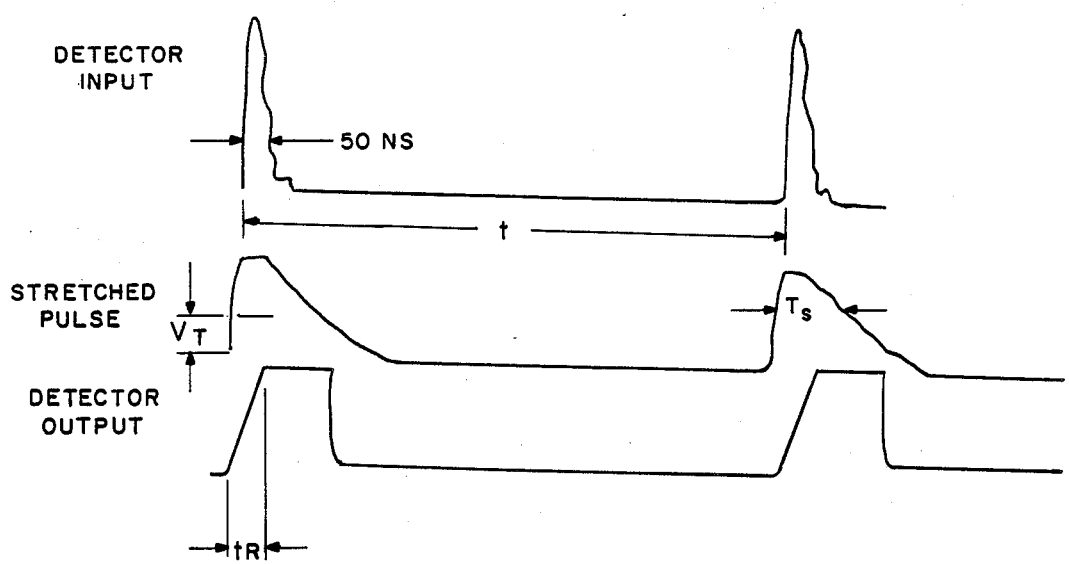
FIG. 11 illustrates three sets of pulses representing from top to bottom the detector input pulse, the stretched pulse, and the detector output shaped pulse.

The electronic shutter control means 40, which controls the operation of the shutter mechanism 100 by energizing solenoids 10 and 10' will now be described with reference to FIGS. 9 through 16. Refer to FIGS. 9 through 11 now to examine how the detected signals of the impinging light from the light sensor means is initially conditioned to properly activate the shutter mechanism 100. FIG. 9 illustrates a one detector light sensor means, shown as detector 44. FIG. 10 shows a three detector, indicated as detectors 44A, 44B, and 44C, light sensor means. In reality, more detectors may be used to sense the impinging light, preferably with each detector facing in different directions in the imaging system field-of-view. It will be explained herein however that the three detectors of FIG. 10 operate to detect different wavelengths of intense damaging light, as examples 10.6 $\mu$m or 1.06 $\mu$m wavelengths.

Refer to FIG. 11 along with FIG. 9 for an explanation of the one detector 44 light sensor means. FIG. 10 will be elaborated on immediately after this description. It is noted that the type detector or detectors used as the light sensor means is based upon the imaging system. Many factors are involved in choosing the proper detectors, such as its bandpass, field-of-view, optical gain, and the dynamic power levels of the damaging light threat. Detectors covering the entire spectrum of interest are desired for obvious reasons of broader utility. The light detected by detector 44, which is biased by voltage V+ connected across the detector 44 and resistor RD to ground, is applied to pulse stretcher 50 if the light is in the form of the very short pulses as depicted at the top of FIG. 11. The very narrow input pulses, which are about 50N seconds typically from some pulsed lasers, of necessity must be stretched prior to being amplified by amplifier 52 since such a short duration pulse rivals the response time of the amplifier and other electronics. The pulse stretcher stretches the incoming pulse in this example to about 5$\mu$ seconds. This slight error of 5$\mu$ seconds produced by stretching of the input pulse is much less than inherent response time of shutters to their inertia plus the clock period of the logic circuitry. The logic circuitry will be explained with reference to FIGS. 13 and 16 herein below. In short, the pulse stretcher 50 only expands the narrow input pulse, shown somewhat exaggerated in the second set of curves of FIG. 11, and does not affect the operation of the remaining electronic circuits in the chain of pulse conditioning circuitry. The stretched pulses are amplified by amplifier 52 and are wave shaped by threshold detector 54 into generally square shaped pulses as represented by the third set of curves of FIG. 11 and at the output of 54. These square shaped pulses represent the detector output that are applied to a timing signals generator 56, which generates the many logic control signals that selectively activate solenoids 10 and 10' of the shutter mechanism. Operation of the timing signals generator 56 is shown in detail in reference to FIGS. 12, 13, and 16 herein below.

Figure 16:
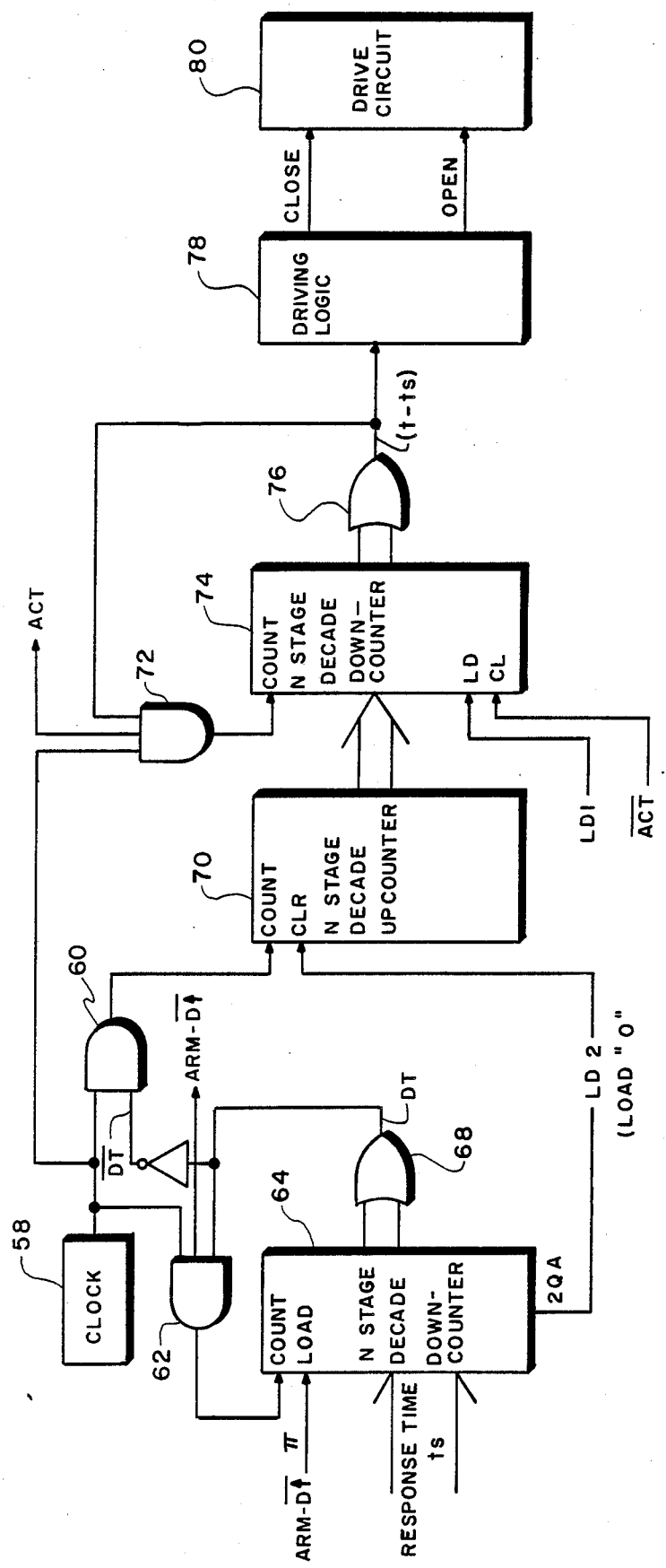
FIG. 16 shows a schematic of the advance operable shutter closing means portion of the electronic means.

The process of pulse stretching by 50, amplifying by 52, and wave shaping by threshold detector 54 is to generate a series of resultant detector pulse signals which are compatible with the logic circuits of FIGS. 13 and 16 and the timing signals generator 56 of FIG. 9. The resultant detector pulse signals are only generated for impinging light over a critical intensity, i.e., the damaging light at the light sensor means. The circuits of 50, 52, and 54 are designed and adjusted to generate these resultant detector pulse signals once the threshold level is exceeded. Note the representative stretched pulsewidth TS and the threshold voltage VT of the stretched pulses. The voltage levels above VT is the portions that are eventually available at the output of 54 as the detector output. Note also that the response time tR of the electronic means is represented in the lower curves of FIG. 11. This response time tR is the response time of the electronics. Knowing the transfer function of the detector 44, the gain of the amplifier 52 and the power level that the imaging system can handle, the threshold level can be established in which once the threshold level is exceeded the logic circuitry will close the shutter by solenoid activation. A safety margin may also be added to the threshold level.

FIG. 10 represents the multidetector light sensor means showing three detectors 44A, 44B, and 44C having separate biasing voltages respectively V1, V2, and V3 thereacross. The detectors have separate voltages for better selecting the sensitivity of each detector to a chosen wavelength of incoming light. Each detector also has separate pulse stretchers and amplifiers to a common point at the input to a threshold detector wave shaper 55. The three separate paths of 44A, 50A, and 52A; 44B, 50B, and 52B; and 44C, 50C, and 52C may separately sense light input of various frequencies in which the activated detector provides the resultant detector pulse signals, shown at the output of 55. Each of the detectors may also face in different directions in the field-of-view of the imaging system and generate the resultant detector pulse signals.

Figure 14:
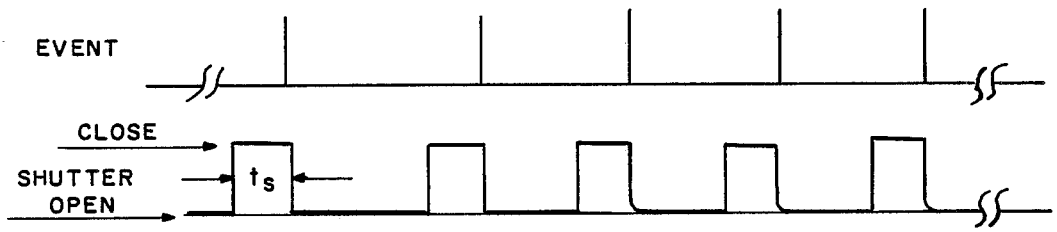
FIG. 14 shows a time comparison of the damaging light pulse event to the natural response time of the shutter which starts prior to the event.

FIG. 14 is presented to illustrate that the response time tS for closing the shutters must be taken into account prior to the event of the damaging light pulses.

Refer now to FIGS. 12, 13A, 13B, 13C, 13D, and 16 to describe the timing diagram and the timing generator logic used in driving the shutters of shutter mechanism 100. The outputs from 54 and 56 of FIG. 9 appear in the curves of FIG. 12 and are referenced in the logic of FIGS. 13A-D and 16. The detector output, indicated herein as the resultant detector pulse signals, and shown in the bottom curve of FIG. 11 as positive generally square waves and indicated as DET at the output of 54 in FIG. 9, and the $\overline{\text{DET}}$ curves which are not shown but are the inverted level of the DET, i.e. the nonpositive pulse, are the original signals that trigger the logic circuits of FIGS. 13A, 13B, 13C, 13D, and 16. Look now at FIG. 13A where a circuit comprised of three J-K flip-flops 90, 96, and 98 is triggered by the DET signal. J-K flip-flop 90 is first triggered to ARM the various circuits, i.e. enable the control system. The ARM signal also goes to a first input to AND gate 92. Looking also at the two top curves of FIG. 12 it is shown that the first DET pulse provides the positive V+ ARM level, which is a logic 1. Tandem J-K flip-flops 96 and 98 are triggered to produce the positive V+ ACT level, but only after the second DET pulse is applied to the clock portion of 96. The V+ ACT level logic is shown by the third curve of FIG. 12. Note that the logic 1 voltage V+ is applied to both the J and the K connections of 96 and the first DET signal produces a logic O output at $\overline{Q}$ and the second DET signal produces the logic 1 that triggers the ACT response from 98. It should be noted that ACT is simultaneously applied to one input of an AND gate 94 and of FIG. 13A and to one input of an AND gate 122 of a RESET logic circuit of FIG. 13D. The RESET logic will be explained herein below with reference to FIG. 13D, but for this time refer to the bottom curve of FIG. 12 and to the RESET connections to 90, 96, and 98 which subsequently are reset by the RESET logic for commencing the same repeated operation. Refer back to FIG. 13A wherein the input DET signal is directly applied to the second input of 94 through the capacitor C of a differentiating network 95. The DET signal is represented as the symbol D ↑ to indicate that the signal starts at the very instant the DET signal goes positive, i.e, at the leading edge. The output of 92 is the ARM·D ↑ curve shown as the fourth curve from the top of FIG. 12, and that commences operation at the first DET pulse. The output from 94 is represented by the LDI curve of FIG. 12, which is D ↑ ·ACT of FIG. 13A.

Figure 13A:
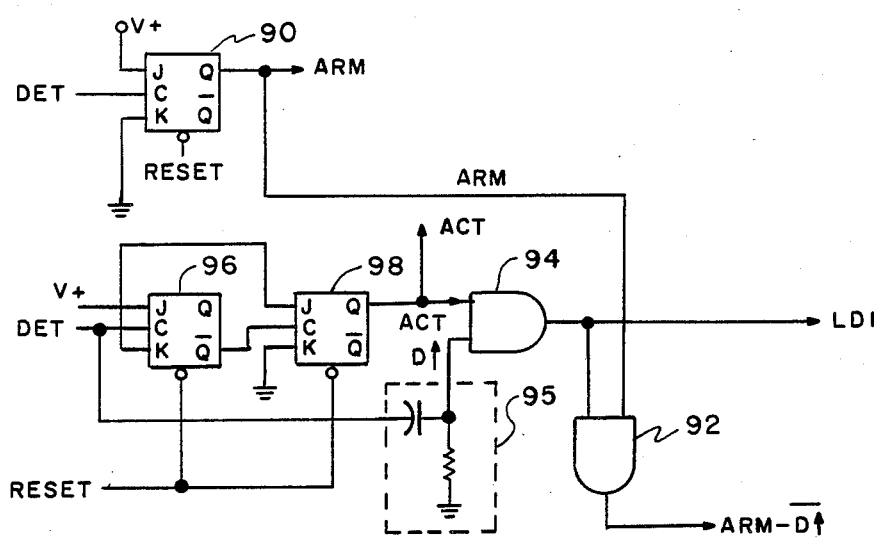
FIGS. 13A, 13B, 13C, and 13D illustrate the logic used to generate the timing signals and to operate the advance operable shutter closing means.
Figure 13B:
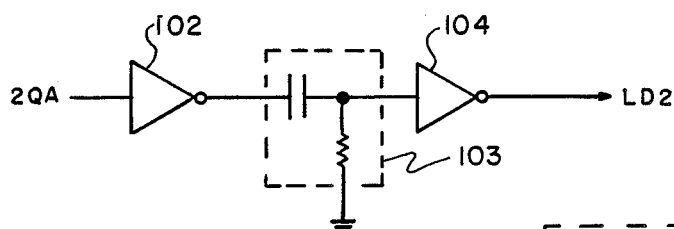

The RESET logic of FIG. 13D will now be described. The two inputs to AND gate 122 are the ACT signal, which is logic 1 after the second DET signal, and the $\overline{DET}$ signal. The ACT input to 122 is a logic 1. When $\overline{DET}$ signal is present at the other input to 122 a logic 1 is present at the output of 122 and the charging circuit 124, comprised of a V+ voltage across resistor RS and negative biased diode in parallel with RS. Charging current flows into capacitor CS and builds up a positive voltage at the input to a logic buffer 126. The positive voltage at the input is a logic 1. Therefore, a logic 1 is at the output of 126 and at the input of NOR circuit 130. An automatic reset circuit 128, comprised of a voltage V+ in series with a capacitor and resistor to ground with the terminal between the capacitor and resistor connected to the second input of 130, is used to automatically reset the J-K flip-flops 90, 96, and 98 when the system is turned on since there would be a spike voltage immediately after applying V+ voltage across the capacitor to establish logic 1 that would decay back to below the threshold voltage and return to logic 0 and thus the logic 0 at the output of 130.

The CLOSE and OPEN curves and the LD1 and LD2 curves of FIG. 12 will now be explained in conjunction with reference to FIGS. 13B, 13C, and 16. FIG. 16 is comprised of three counters and their associated decoding logic, driving control logic, and the system clock which has a frequency determined by the frequency of the damaging light event, the response time of the shutters, and the number of counting stages within the three counters. The clock period may, as one example, have a repetitive period of one millisecond with a 50% duty cycle and a three stage decade counter whose maximum count equals 999× the clock time.

The response time tS of the shutter mechanism can be determined. Once tS is determined, the electronic shutter control means comprised of the logic and drive circuits shown by FIGS. 9–16 may activate the shutter mechanism 100 at a time equal to the frequency of the repetitive damaging light event offset by the response time tS of the shutters. See FIG. 14 again for an illustration of the time tS starting just prior to the start of the event. The repetition period of the event, represented as t, is measured by the logic circuit of FIG. 16. Time tS is then subtracted therefrom, resulting in time t−tS, a time at which the shutter should start its closing action to ensure that it is fully closed by the time the damaging light arrives.

Refer now to FIG. 16 where a response time tS is applied to a first counter 64, which is a N-stage decade down counter. Downcounter 64 may only have 2-stages which will count through the approximate 40 milliseconds for tS that is typically needed for closing the shutters. The counter 64 produces a logic 1, i.e. a voltage at the output of the OR gate 68 at the time tS is loaded. When ARM·D ↑ logic pulse is simultaneously applied to the load terminal of 64 and as an input to AND gate 62 along with the clock pulse from clock 58 then the AND gate 62 is thus switched on and starts the count down in 64 from the preset time tS until the counter detects that it has reached the "zero" count. At the "zero" count 64 is disabled by the zero DT signal passed through OR gate 68 and applied to 62. The timer interval counter 70 is enabled by the $\overline{DT}$ positive signal provides by an inverter being clocked into AND gate 60 and to the count terminal of 70. The time interval counter 70, which is an up counter and is also referred to herein as the second counter, starts at zero and counts up until the arrival of the leading edge of the next detector pulse DET signal, which is represented by ARM·D ↑ which is the curve shown at the load input to 64 and in FIG. 9. Prior to the time that counter 70 is enabled and starts counting, 70 is cleared by an LD2 pulse. This LD2 pulse is repeatedly generated in counter 64 at a time less than the response time tS to assure that 70 is cleared each time prior to its being enabled to start the count. Refer now to FIG. 13B for a schematic illustration of how the count from the second stage, represented as 2QA, of the 2-stage counter produces the output to load the second counter 70, represented as LD2. A logic 0 pulse is applied to inverter 102, which produces a positive spike across the capacitor of the timing circuit 103 to the input of inverter 104. The output of 104 is the negative spikes LD2 illustrated in FIG. 12 at an off time for $\overline{DT}$, shown in FIG. 12. It should be noted that the $\overline{DT}$ of FIG. 16 is not the same as $\overline{DET}$ of FIG. 12. Rather, the $\overline{DT}$ is only present at the count terminal of the second counter 70 when the system clock 58 is clocked to a positive pulse and first counter 64 has counted down until it has reached zero and generates the delay time signal, indicated as DT, at the output of the NOR circuit 68. Since the DT signal is at zero, 62 is disabled and 60 is enabled because the DT is inverted to a $\overline{DT}$, which is now a positive signal.

Figure 12:
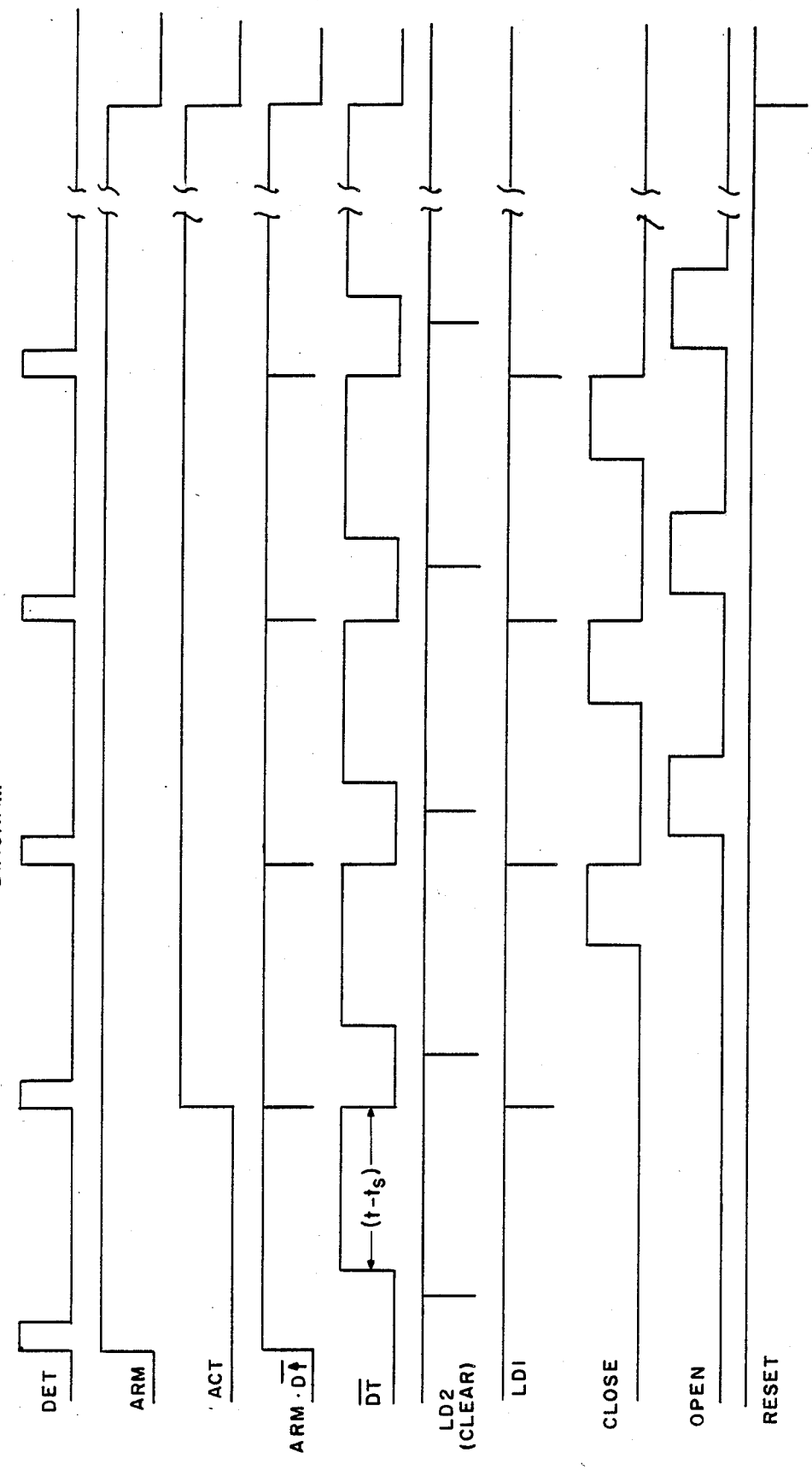
FIG. 12 illustrates the timing diagram of the many operations involved in activating the shutter mechanism.

The second counter, i.e. the time interval counter 70, counts up during the delay time $\overline{DT}$, which is the time t−tS and as shown in FIG. 12. The third counter 74, which is an N-stage decade downcounter, is cleared by the ACT signal prior to the start of the event and is loaded by an LD1 signal with both shown in FIG. 13A and which start at the leading edge of the second detector pulde DET. After counter 74 has been cleared it is loaded with an output from the up-counter 70 which is representative of the time t−tS is loaded into 74, thus applying a positive voltage at the output of OR gate 76 which along with the clock pulse from 58 and the ACT signal at the beginning of the second detector pulse starts the count down in 74. After the time t−tS, counter 74 output goes to zero thus shutting off AND gate 72 and applying a signal to the driving logic 78 and to the drive circuit 80.

Figure 13C:
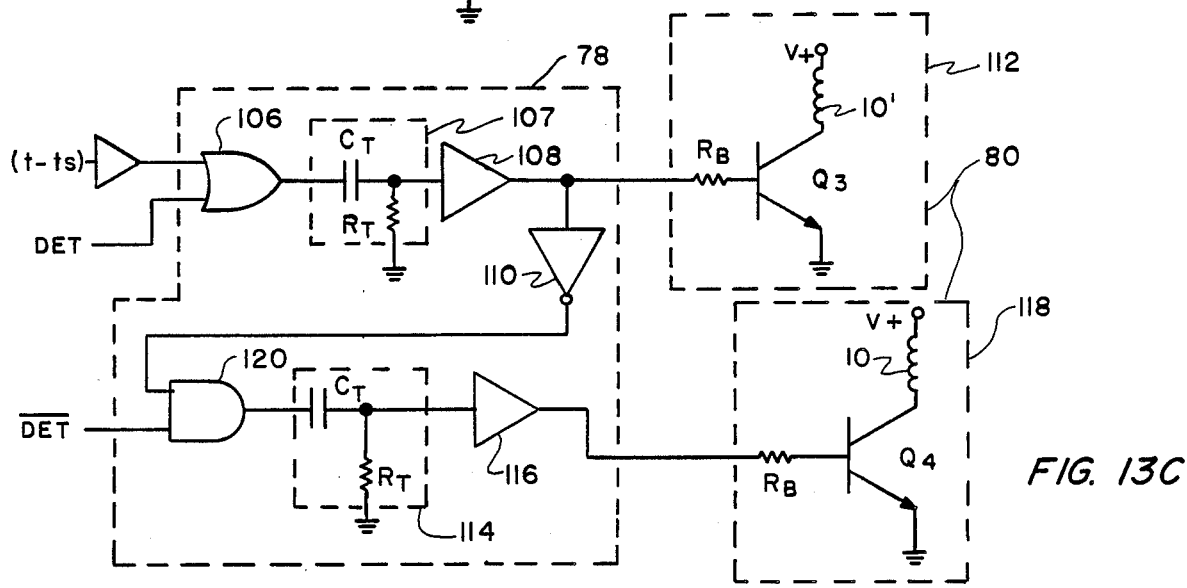
Figure 13D:
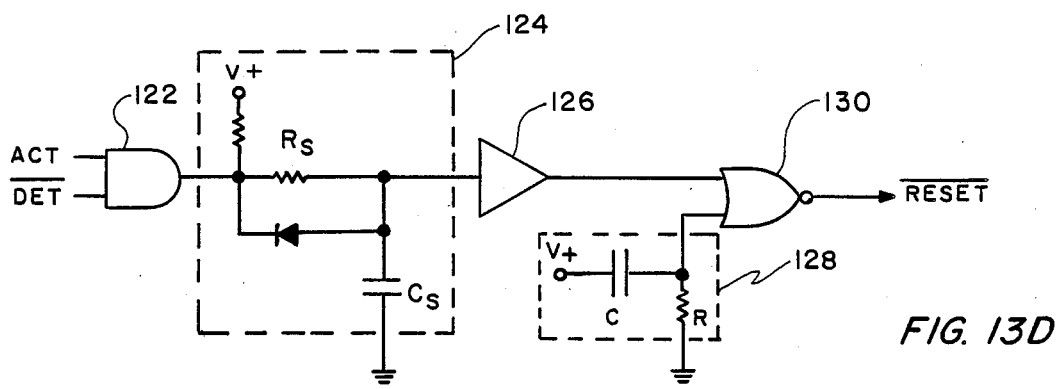

The driving logic 78 and drive circuit 80 is best explained referring to FIG. 13C wherein the t−tS signal is shown applied to an OR gate 106 through a first inverter. Signal t−tS is inverted from a logic 0 to a logic 1 prior to arrival at the timing circuit 107 because the output of buffer amplifier 108 should be a positive pulse to cause conduction in N-P-N transistor Q3 and be inverted again by a second inverter 110 to a logic 0 at the input to AND gate 120 to insure that the closing action is completed before opening action can be initiated. Since $\overline{DET}$ is positive at this time and the output of gate 110 is logic 0, no signal will be passed through the timing circuit 114 and the inverter 116 to activate N-P-N transistor Q4 into conduction. The driving logic of FIG. 13C is enclosed by dashed line 78 and the drive circuit is indicated by numeral 80. The drive circuit 80 is comprised of solenoid 10′ drive circuit 112 and solenoid 10 drive circuit 118, with solenoid 10′ chosen in the closed position and solenoid 10 chosen in the open position to be consistent in this description. At the end of the t−tS pulse the solenoid action will be just opposite. The entire counting process repeats on the leading edge of the next DET pulse.

Figure 15:
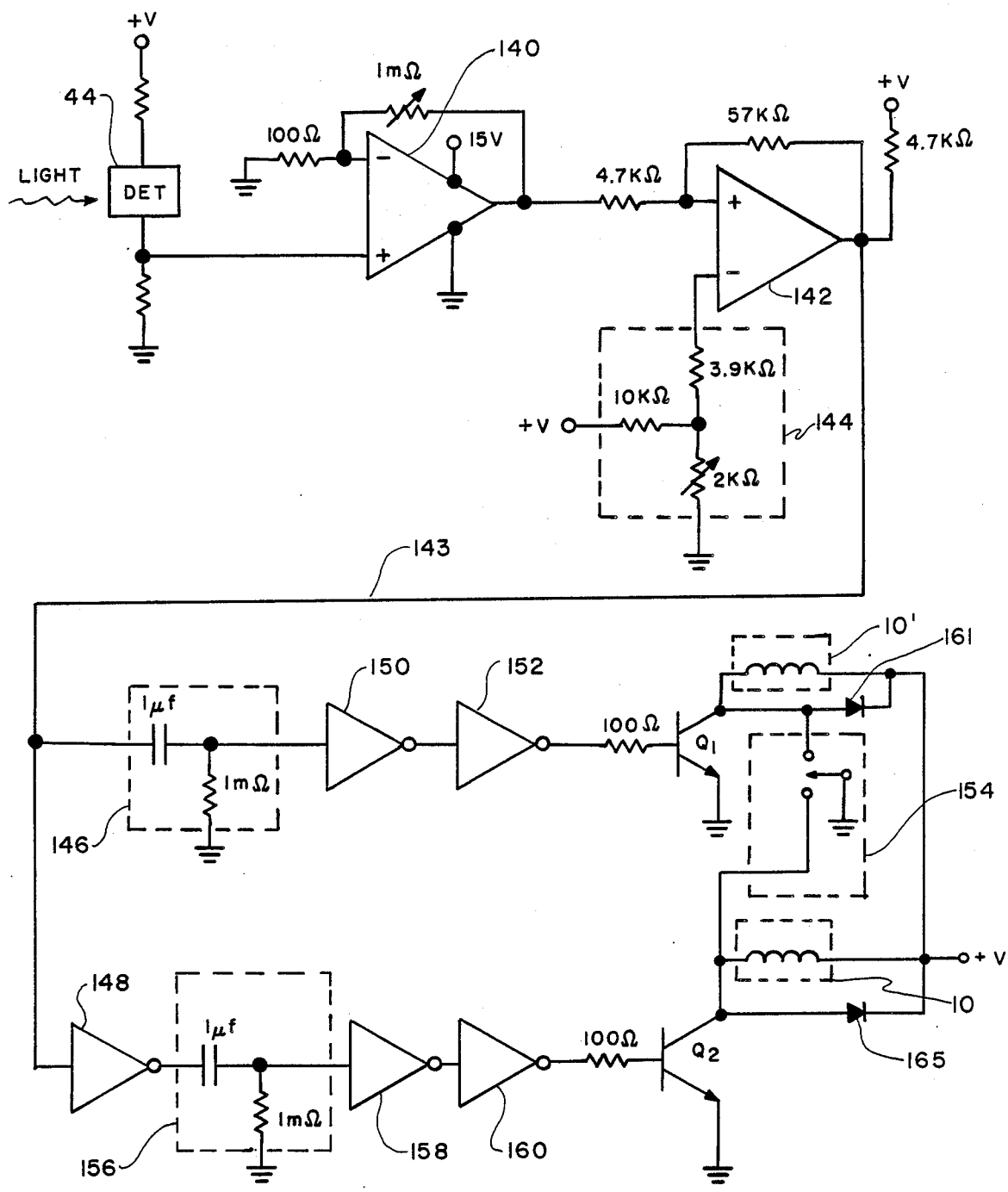
FIG. 15 illustrates the continuous shutter closing means which operates when damaging continuous wave light is present.

FIG. 15 illustrates an electronic continuous shutter closing means when continuous wave light generating an output about a threshold of the electronics is present on the front of the shutter mechanism 100. Note that the very same detector 44 may be used as in the single light sensor means described with reference to the advance operable shutter closing means of FIG. 9. The output of the detector, which is the continuous wave damaging light is first applied to an operational-amplifier 140. Amplifier 140 may have typical valves as shown. The amplified signal is applied to the positive input of a threshold detector 142 with biases as shown to set a selected level to trigger detector 142 "on". The voltage divider 144 sets the level for triggering. Once the output of 140 exceeds the level of 144, the output from 142 goes high. Since the input damaging light on detector 44 in this particular case is continuous, the high output from 142 is also continuous as shown on the lead line 143 until the damaging light is removed. The leading edge of the voltage step on lead 143 triggers transistor Q1 into conduction, and thus causes current flow through the coil of shutter closing solenoid 101. Transistor Q1 remains on for a period of time determined by 146 and the shutters of shutter mechanism 100 closed as long as the output from 142 is high since the high voltage is applied to the wave shaper circuit, comprised of inverters 150 and 152, through the capacitor of the timing circuit 146. When the damaging light is removed from detector 44 the high voltage is removed at the output of 142. Thus, this falling edge of the high voltage triggers transistor Q2 into conduction, and causes current flow through the coil of opposing shutter opening solenoid 10 and opens the shutters. Timing circuit 156 and the wave shaper circuit, comprised of inverters 158 and 160, operate the same as 146, 150, and 152 explained above but the trailing edge is inverted by inverter 148 to provided the needed high voltage input to 156.

It is to be understood that various omissions and substitutions or changes in the details of the illustrated embodiments may be made by one skilled in the art without departing from the spirit of the invention. It is the intent therefore to be limited only by the scope of the claims.

I claim:

1. An electromagnetically controlled shutter closing means used with an imaging system for limiting the permanent damages to the imaging system detector array whose detectors are vulnerable to damaging intense light from a high energy light source, said shutter closing means comprised of:

a shutter mechanism comprised of a plurality of parallel vane type shutters in which adjacent pairs of said shutters are rotated by electromagnetically controlled dual linear motion racks in opposite directions about an axis generally in the center of each shutter to minimize inertial mass and allow fast movement of said shutters, said dual linear motion racks comprised of an upper rack and a lower rack which are hard connected to solenoid activated dual yokes, said dual yokes comprised of one yoke at each end of said shutter mechanism reacting with a solenoid wherein said dual yokes are equally skewed to offset said upper linear rack and said lower linear rack in parallel with each other in which said upper and lower racks reciprocally move together and have gear teeth along one side thereof in which said axis of each shutter is comprised of pinion wire gear teeth thereon fixedly attached to said plurality of parallel vane type shutters wherein said pinion wire gear teeth mesh with the gear teeth on said upper and lower linear racks to translate linear motion of said racks to rotational motion of alternate shutters in opposite directions causing opening of the shutters when the racks move in one direction and closing of the racks when moving in the opposite direction;

a light sensor means on the front of said shutter mechanism for detecting damaging light impinging thereon, said light sensor means comprised of a plurality of light sensor detectors with each detector facing in different directions from the centerline of the imaging system field-of-view to generate outputs therefrom in accordance with the bandpass, the field-of-view, the optical gain, and the dynamic power levels of said damaging light impinging thereon; and an electronic shutter control means for controlling said solenoid of said solenoid activated dual yokes and responsive to light intensity generated above a threshold level from said output of said light sensor means for activating said shutter mechanism to selectively close said plurality of parallel vane type shutters from a normally open position to limit the amount of damaging light impinging on the detectors of said imaging system detector array, said electronic shutter control means having both an advance operable shutter closing means to commence closing of said shutters prior to the event of each of the damaging light pulses impinging on the front of said shutter mechanism and a continuous shutter closing means that protects against continuous wave damaging light which also starts closing said shutters upon arrival of a signal from said light sensor means indicating the impinging of damaging light thereon and maintains said shutters closed until the damaging light is no longer impinging on said shutter mechanism and immediately opens said shutter to resume normal imaging system operations.

2. A shutter closing means as set forth in claim 1 wherein said dual linear motion racks reciprocate through linear bearings in a linear bearing mount at each end of said shutter mechanism.

3. A shutter closing means as set forth in claim 2 wherein said solenoid activated dual yokes are comprised of a center portion into which a moveable solenoid rod is mounted and end yoke mounts onto which said upper and lower linear racks are attached to move through said linear bearings of said linear bearing mount.

4. A shutter closing means as set forth in claim 3 wherein said plurality of parallel vane type shutters are made of a flat black plastic in which the ends of said shutters overlap to restrict light from being transmitted therethrough when said shutters are closed.

5. A shutter closing means as set forth in claim 4 wherein said continuous shutter closing means is comprised of an operational amplifier that amplifies said detector output signal from said light sensor means and applies the amplified detector signal to a threshold detector which has a trigger voltage level circuit associated therewith in which the output from said threshold detector is a positive continuous voltage applied through serially connected first timing and wave shaper circuits to a shutter closing drive circuit as long as the impinging damaging light is present on said light sensor means and wherein said positive continuous voltage activates a shutter closing solenoid of said solenoid activated dual yokes and when the damaging light is removed the outputs from said threshold detectors are inverted by an inverter serially connected with second serially connected timing and wave shaper circuits to start current flow through the coil of a shutter opening solenoid of said solenoid activated dual yokes.

6. A shutter closing means as set forth in claim 5 wheein said advance operable shutter closing means is comprised of pulse stretching, amplifying, and wave shaping of the detector output from said light sensor means to produce generally square shaped detector pulses which are applied to timing generator and driving logic for producing control signals from a drive circuit to the two solenoids of said solenoid activated dual yokes.

7. A shutter closing means as set forth in claim 6 wherein said timing generator and driving logic and drive circuit are comprised of a continuously clocked counter logic circuit controlled by timing signals generated in said timing generator and driving logic to activate said drive circuit to drive said solenoid activated dual yokes, wherein said counter logic circuit is further comprised of three counters and their associated decoding and driving control logic and system clock having a frequency determined by the frequency of the damaging light event and shutter response time wherein first and third counters are N-stage downcounters and a second counter is an N-stage time interval upcounter, said first counter having a shutter time response tS initially loaded therein at the beginning of each cycle and is triggered to begin counting down said tS by the output from an associated AND gate having as three inputs a logic 1 at the output of said first counter when loaded with tS and a clocked pulse from a system clock at said second input and simultaneously logic 1 inputs from a control signal generator circuit which automatically generates the required signal upon the arrival of the first detector signal DET applied to a third input of said AND gate and to a load terminal of said first counter wherein said first counter counts down said tS time to zero and produces a logic 0 at the output thereof which disables the first counter associated AND gate and enables an AND gate associated with said second counter wherein said second counter is repeatedly cleared by another timed output from said first counter that is less than said tS time in which said second counter starts counting up from zero when clocked after the anablement of its related AND gate and counts up for a delay time $\overline{DT}$ identified as $t-tS$ which is defined as the repetition time period between the leading edges of said DET signals represented by t with said response time tS subtracted therefrom whereupon said $t-tS$ delay time signal is applied to the input of said third counter after said third counter is cleared and loaded by said control signal generator circuit, wherein output from said third counter is a logic 1 when loaded with said $t-Ts$ signal and is applied to one input of an AND gate associated with said third counter and when a logic 1 from said system clock is simultaneously clocked with an ACT signal logic 1 from said control signal generator circuit to second and third inputs to said AND gate said third counter begins a count down through the $t-Ts$ signal time until it reaches zero, said zero output from said third counter is simultaneously applied to said associated AND gate and to said driving logic to open and close said shutters by said drive circuit wherein said driving logic is comprised of a first inverter to invert said zero output from said third counter to a logic 1 signal prior to being applied to an input of an OR gate through a timing circuit to a buffer amplifier wherein the buffer amplifier output signal is applied to a shutter closed position solenoid drive circuit to close said shutters when a zero output is present at the third counters and is further applied to the input of a second inverter connected with its output to one input of an AND gate and a $\overline{DET}$ signal at a second input thereto where the output of said AND gate is applied to the input of a buffer through a timing circuit wherein the timed output from said buffer is applied to a shutter open position solenoid drive circuit to open said shutters on the falling edge of the DET signal.

8. A shutter closing means as set forth in claim 7 wherein said both solenoid drive circuits are comprised of an N-P-N transistor connected in series with solenoid coils in which the base of said transistor is connected to the output of said buffer.

* * * * *